United States Patent
Narita et al.

(10) Patent No.: US 8,149,868 B2
(45) Date of Patent: Apr. 3, 2012

(54) INTERFACE BOARD AND OPTICAL TRANSMISSION EQUIPMENT

(75) Inventors: Hidemasa Narita, Yokohama (JP);
Takao Fukushima, Funabashi (JP);
Masatoshi Shibasaki, Yokohama (JP);
Toshiyuki Atsumi, Yokohama (JP);
Yukihisa Tamura, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 186 days.

(21) Appl. No.: 12/039,379

(22) Filed: Feb. 28, 2008

(65) Prior Publication Data
US 2008/0232818 A1    Sep. 25, 2008

(30) Foreign Application Priority Data

Mar. 14, 2007 (JP) .................... 2007-064341

(51) Int. Cl.
*H04J 3/22* (2006.01)

(52) U.S. Cl. ......... 370/465; 370/538; 370/543; 398/164
(58) Field of Classification Search ............ 398/164
See application file for complete search history.

(56) References Cited

U.S. PATENT DOCUMENTS

| | | | |
|---|---|---|---|
| 6,956,847 B2 * | 10/2005 | Heston et al. | 370/353 |
| 2007/0076757 A1 * | 4/2007 | Dodd et al. | 370/469 |
| 2008/0075113 A1 * | 3/2008 | Harley et al. | 370/466 |

* cited by examiner

*Primary Examiner* — Brian Roberts
(74) *Attorney, Agent, or Firm* — Brundidge & Stanger, P.C.

(57) ABSTRACT

A circuit capable of processing signals of different signal types is provided for identifying the signal type by the signal type setting from an administrator or by the implementation of the optical module, thereby selecting a signal processor to be used. An OTN frame standardized by ITU is used in a fixed manner independent of the signal type to be accommodated, while a corresponding SDH/SONET frame standardized by ITU is used for signal accommodation.

4 Claims, 15 Drawing Sheets

FIG.1

| No. | SIGNAL TYPE | | | TRANSMISSION SPEED |
|---|---|---|---|---|
| 1 | SDH/SONET | STM-0 | OC-1 | 51.84 Mbps |
| 2 | | STM-1 | OC-3 | 155.52 Mbps |
| 3 | | STM-4 | OC-12 | 622.08 Mbps |
| 4 | | STM-16 | OC-48 | 2.48832 Gbps |
| 5 | | STM-64 | OC-192 | 9.95328 Gbps |
| 6 | | STM-256 | OC-768 | 39.81312 Gbps |
| 7 | GbE (GIGABIT ETHERNET) | 1000BASE-X | | 1.25 Gbps |
| 8 | 10GbE (10 GIGABIT ETHERNET) | 10GBASE-X | | 3.125×4 Gbps |
| 9 | | 10GBASE-R | | 10.3125 Gbps |
| 10 | | 10GBASE-W | | 9.95328 Gbps |
| 11 | FC (FIBER CHANNEL) | FC | | 1.0625 Gbps |
| 12 | | FC | | 2.125 Gbps |
| 13 | | FC | | 4.25 Gbps |
| 14 | | 10GFC | | 10.51875 Gbps |
| 15 | | 10GFC | | 3.1875×4 Gbps |

FIG.7

| INPUT CONDITION | DETERMINATION RESULT | | | |
|---|---|---|---|---|
| TYPE CODE | OPERATION MODE SETTING | BANDWIDTH ALLOCATION | OPTICAL MODULE TYPE | SIGNAL TYPE |
| CODE1 | 1000BASE-X MODE | USED BANDWIDTH :9×4320BYTES UNUSED BANDWIDTH :9×12960BYTES | 1000BASE-SX | GbE |
| CODE2 | | | 1000BASE-LX | |
| CODE3 | STM-64 MODE | USED BANDWIDTH :9×17280BYTES UNUSED BANDWIDTH :NONE | I-64.1/SR-1 | STM-64 |
| CODE4 | | | I-64.2/SR-2 | |
| CODE5 | | | S-64.2b/IR-2 | |
| CODE6 | STM-16 MODE | USED BANDWIDTH :9×4320BYTES UNUSED BANDWIDTH :9×12960BYTES | I-16 | STM-16 |
| CODE7 | | | S-16.1 | |
| CODE8 | | | L-16.1 | |
| CODE9 | | | L-16.2 | |
| CODE10 | STM-4 MODE | USED BANDWIDTH :9×1080BYTES UNUSED BANDWIDTH :9×16200BYTES | I-4 | STM-4 |
| CODE11 | | | L-4.1 | |
| CODE12 | | | L-4.2 | |
| CODE13 | STM-1 MODE | USED BANDWIDTH :9×270BYTES UNUSED BANDWIDTH :9×17010BYTES | I-1 | STM-1 |
| CODE14 | | | L-1.1 | |
| CODE15 | STM-0 MODE | USED BANDWIDTH :9×90BYTES UNUSED BANDWIDTH :9×17190BYTES | I-0 | STM-0 |
| CODE16 | | | L-0.1 | |
| CODE17 | | | L-0.3 | |

FIG.8

| OPERATION MODE | PARALLEL LOW-SPEED SIGNAL SPEED | PARALLEL LOW-SPEED SIGNAL EXPANSION NO. | USED PARALLEL NO. | UNUSED PARALLEL NO. |
|---|---|---|---|---|
| 1000BASE-X MODE | 50Mbps | 192 | 48 | 144 |
| STM-64 MODE | | | 192 | 0 |
| STM-16 MODE | | | 48 | 144 |
| STM-4 MODE | | | 12 | 180 |
| STM-1 MODE | | | 3 | 189 |
| STM-0 MODE | | | 1 | 191 |

→ : MULTIPLEXING DIRECTION
← : DEMULTIPLEXING DIRECTION

INTERFACE BOARD AND OPTICAL TRANSMISSION EQUIPMENT

CLAIM OF PRIORITY

The present application claims priority from Japanese patent application serial no. 2007-064341, filed on Mar. 14, 2007, the content of which is hereby incorporated by reference into this application.

BACKGROUND OF THE INVENTION

The present invention relates to an interface board and optical transmission equipment that multiplex plural optical signals received from plural lines to transmit to a backbone network, as well as demultiplex a multiplexed optical signal received from the backbone network into individual optical signals to transmit to individual lines.

With a recent increase of traffic volume due to the growing number of broadband Internet access lines, there has been a demand to provide high-speed high-capacity networks. As a method to realize this, optical network equipment using Wavelength Division Multiplexing (WDM) technology are widely used. WDM is a technology for multiplexing optical signals of different wavelengths to a single optical fiber, able to easily realize high-capacity communication by addition of the number of wavelengths to be multiplexed without installation of new optical fibers. In recent years, networks having more flexible and various functions are desired, such as dropping and adding of any wavelengths at intermediate nodes, in addition to providing high-capacity communication. Such network transmission equipment is called Optical Add Drop Multiplexer (OADM).

Further, in recent years, signals connected to a network have been diversified according to their applications. Such signals are exemplified by Ethernet standardized by IEEE802.3, and Synchronous Digital Hierarchy/Synchronous Optical Network (SDH/SONET) standardized by ITU-T G.707 and ANSI TI.105. FIG. 1 is a list of signals to be connected to an optical network. As shown in FIG. 1, there are many types of signals to be connected to an optical network, such as SDH/SONET, GbE, 10 GbE, and Fiber Channel. Also, the transmission speeds of these signal types widely vary from 50 Mbps (bit per second) to 40 Gbps.

As described above, the optical network handles many signal types. Adoption of a different monitoring control method for each signal only makes maintenance complicated. For this reason, there has been a demand for providing a network management method independent of the signal type. A typical method for meeting such a demand is a network monitoring using an Optical Transport Network (OTN) frame standardized by ITU-T G. 709. Optical Channel (Och) frame of OTN can be mapped independent of the signal type, allowing an integrated monitoring control of the whole network. In the method using an OTN frame, fault management is possible in the OTN section by accommodating a signal to the OTN frame, adding an overhead for the OTN frame which is different from the accommodation signal, and monitoring the overhead of the OTN frame. Monitoring is also possible to determine the network section in which a failure occurs, the network between transmission equipment items or the network section of an optical signal to be accommodated. Further, long distance transmission is possible by adopting Forward Error Correction (FEC) codes.

Examples of references are as follows:

1. ITU-T G.709 Interface for the optical transport network (OTN)
2. ITU-T G. 707 Synchronous Digital Hierarchy (SDH)
3. ANSI T1.105 Synchronous Optical NETwork (SONET)
4. ANSI T11 10 Gbit Fiber Channel (10GFC)
5. IEEE standard 802.3 Information Technology—Telecommunications and information exchange between systems—Local and metropolitan area networks—Specific requirements—Carrier sense multiple access with collision detection (CSMA/CD) access method and physical layer specifications
6. IEEE standard 802.3ae Information technology—Telecommunications and information exchange between systems—Local and metropolitan area networks—Specific requirements—Part 3: Carrier sense multiple access with collision detection (CSMA/CD) access method and physical layer specifications—Media Access Control (MAC) Parameters, Physical Layer and Management Parameters for 10 Gb/s Operation There are three transmission speeds defined in OTN: OTU (Optical Channel Transport Unit)-1 for 2.5 Gbps, OTU-2 for 10 Gbps, and OTU-3 for 40 Gbps. However, the low-speed signals with a transmission speed of less than 2.5 Gbps have not been standardized yet.

Meanwhile, because adoption of the OTN optical transmission enables integrated management of a network, mapping to the standardized OTN frame even with the transmission speed of less than 2.5 Gbps is also efficient in terms of network management. Thus, there has been adopted methods of mapping the low-speed signals with transmission speed of less than 2.5 Gbps into OTN frames originally standardized by equipment vendors. In the methods, plural signals are multiplexed in order to apply the transmission speed of less than 2.5 Gbps to the OTN frame standardized by ITU-T G. 709. Conventionally, multiplexing is realized by terminating information called a pointer (PTR) that indicates the frame position in which the first position of the virtual container is multiplexed, in order to map the input signals to the OTN frame. This makes it difficult to connect between transmission equipment items of different equipment vendors due to adoption of the vendor specific OTN frames.

FIG. 1 shows signals of different transmission speeds and frame formats. Transmission equipment includes an interface board to connect such signals to a backbone network. The interface board performs processing at an OTN signal speed corresponding to a signal type to be accommodated. Thus, in order to process plural signals, the interface board is necessary to have plural OTN function units. The OTN function units have different configurations for each signal speed, which limits the amount of hardware to be installed in the interface board. For this reason, multi-rate interface boards supporting a wide range of transmission speeds have not been realized, only allowing supporting signals with a limited range of transmission speeds, such as low-speed signals or high-speed signals.

In order to meet the traffic demand that is expected to further increase in the future, it is necessary to provide optical transmission equipment including a flexible multi-rate interface board capable of accommodating signals of different transmission speeds into the OTN frame.

SUMMARY OF THE INVENTION

The present invention addresses these needs by providing optical transmission equipment including an interface board capable of processing different types of signals. In the optical transmission equipment, the interface board determines a signal that can be accommodated by the signal setting from an administrator or by the implementation of an optical module, and selects the signal process to be used. An OTN frame standardized by ITU is used in a fixed manner independent of the signal type to be accommodated, while a corresponding SDH/SONET frame standardized by ITU is used for signal accommodation. The SDH/SONET frame is configured to have a signal speed equal to or higher than the speed of the signal type to be accommodated. Because the OTN frame is used at a fixed rate, not only low-speed signals but also high-speed signals can be supported, without the need for configuring plural OTN frame function units.

The accommodation signal to be accommodated in the SDH/SONET frame can have a transmission speed equal to or lower than the OTN frame rate. Further, even if plural signals can be multiplexed, no multiplexing takes place, and instead the OTN frame is clock synchronized with the signal to be accommodated. This eliminates the clock difference with the signal to be accommodated which can be perfectly transmitted without being terminated.

BRIEF DESCRIPTION OF THE DRAWINGS

Preferred embodiments of the present invention will now be described in conjunction with the accompanying drawings, in which:

FIG. 1 is an illustration of signal types to be connected to an optical network;

FIG. 7 is an illustration of an operation mode definition table;

FIG. 8 is illustration of a parallel speed and signal expansion table;

DESCRIPTION OF THE PREFERRED EMBODIMENTS

Figure 2:
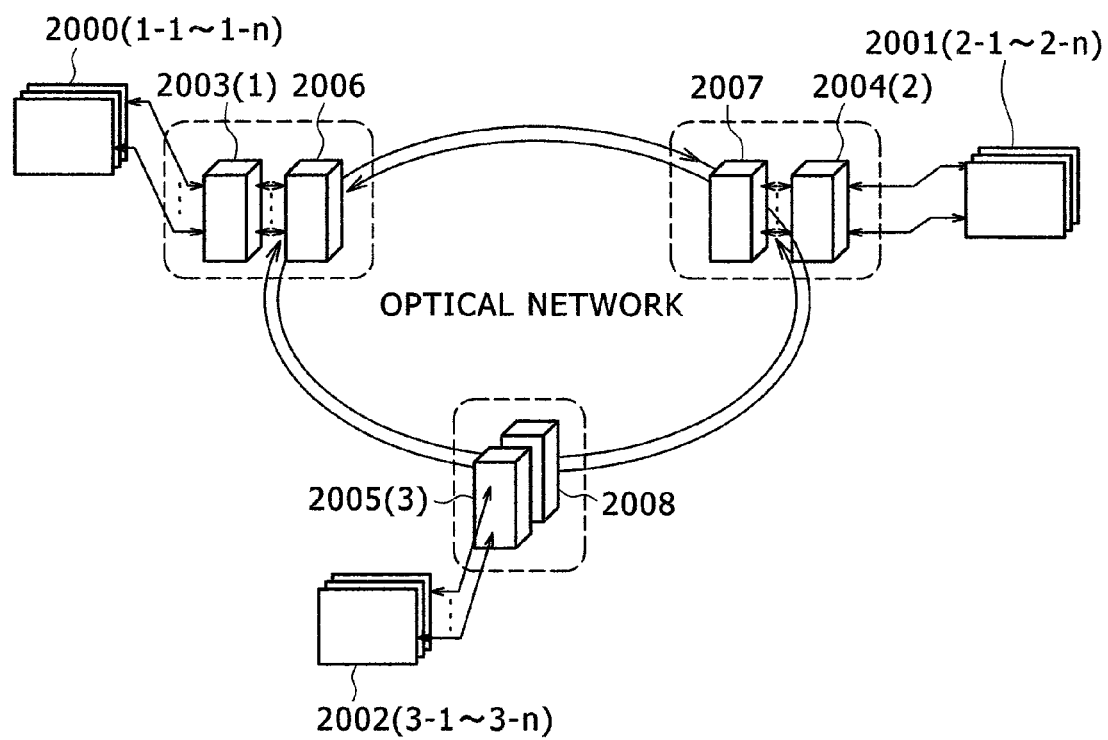
FIG. 2 is a hardware block diagram of an optical network using OTN.

FIG. 2 is a hardware block diagram of an optical network using OTN. Signals shown in FIG. 1 are output from client devices 1-1 to 1-*n* (2000), client devices 2-1 to 2-*n* (2001), or client devices 3-1 to 3-*n* (2002). The signal are transferred to Och frames in an interface housing 1 (2003), an interface housing 2 (2004), or an interface housing 3 (2005). The Och frames are multiplexed in a wavelength multiplexing unit 2006, a wavelength multiplexing unit 2007, or a wavelength multiplexing unit 2008. Then, the multiplexed signal is connected to an OTN optical network. The wavelength multiplexing units 2006 to 2008 are placed in a ring configuration, but able to provide point-to-point transmission with the client devices parts 1 to 3, respectively. Hereinafter, typical two embodiments will be described with reference to the accompanying drawings.

Embodiment 1

Figure 3:
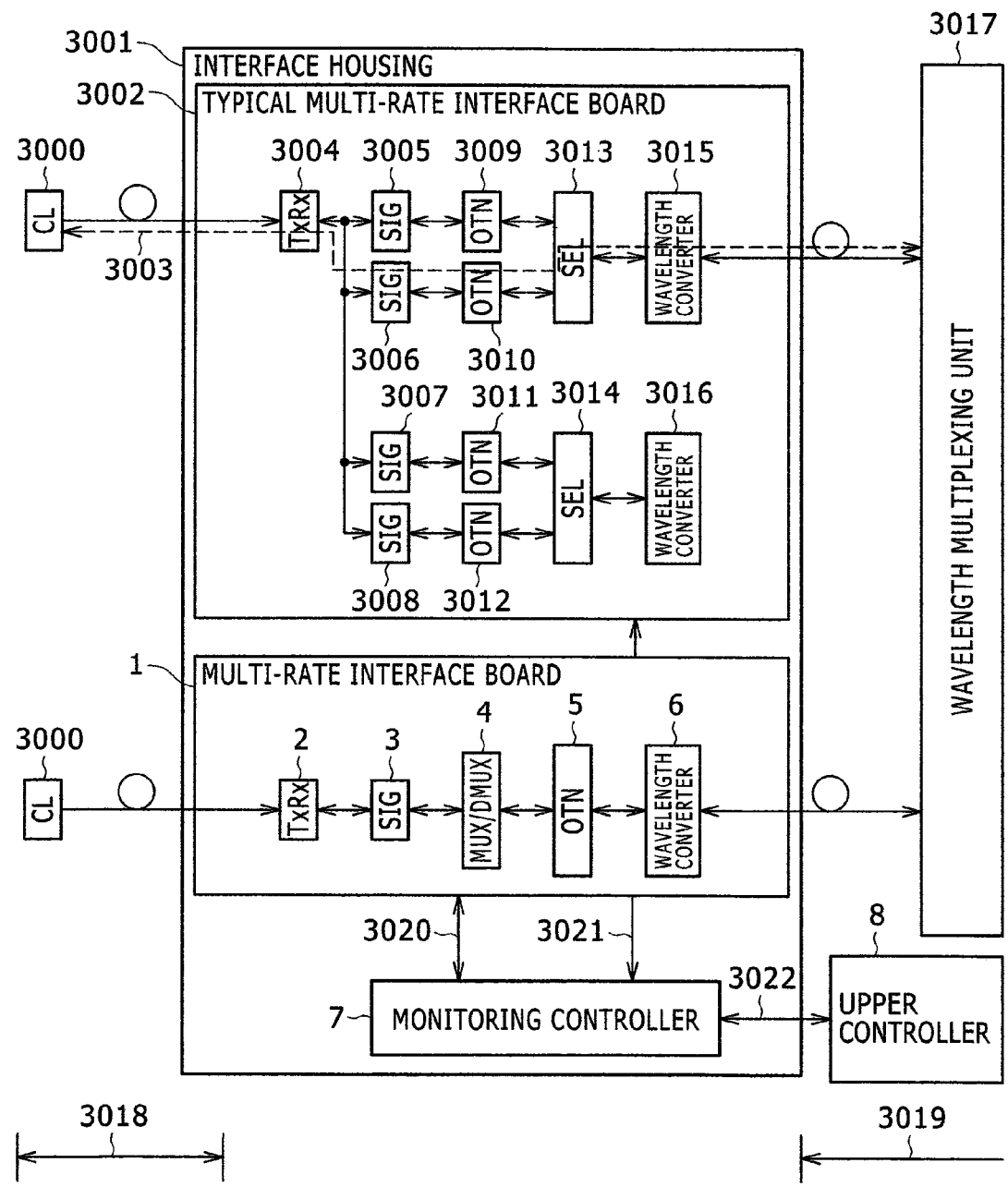
FIG. 3 is an illustration of the configuration of a multi-rate interface board.

FIG. 3 shows the configuration of a multi-rate interface housing 3001 capable of accommodating signals of different speeds. FIG. 3 shows a typical conventional multi-rate interface board 3002 for comparison, and a multi-rate interface board 1 of a first embodiment.

The conventional multi-rate interface board 3002 includes: an optical module unit 3004 in which an optical module is installed to receive and process optical signals according to various signal types; plural signal processing units (3005 to 3008) for individual signal types according to various signals; OTN function units (3009 to 3012) for accommodating OTN frames of various signal types; signal selectors (3013, 3014) for selecting one of the signal processors for signal input/output, according to the signal type to be accommodated; and wavelength converters (3015, 3016) for converting to a predetermined optical wavelength for wavelength multiplexing.

The optical module unit 3004 is installed with an optical transceiver module (hereinafter simply referred to as an optical module), which is called Small Form-factor Pluggable (SFP) or 10 Gigabit Small Form-factor Pluggable (XFP), in order to accommodate optical signals of different speeds.

In the conventional multi-rate interface board 3002 shown in FIG. 3, an STM-16 signal 3003 of SDH is connected. The OTN function units (3009 to 3012) are provided with OTN interface functions each having a fixed rate corresponding to each signal. Here, the STM-16 signal is processed by the signal processor 2 (3006), followed by the OTN function unit 2 (3010). The signal selector 3013 selects the OTN function unit 3010 in which the signal type STM-16 is accommodated, by a monitoring control signal 3021. Upon selection of the OTN function unit 3010, the wavelength converter 3015 converts the signal processed by the OTN function unit 3010, to an optical signal of a specific wavelength. Then, the optical signal is transmitted to the wavelength multiplexing unit 3017. As described above, the conventional multi-rate interface board 3002 is necessary to have a separate circuit for each signal to be accommodated, causing a cost increase.

Figure 4:
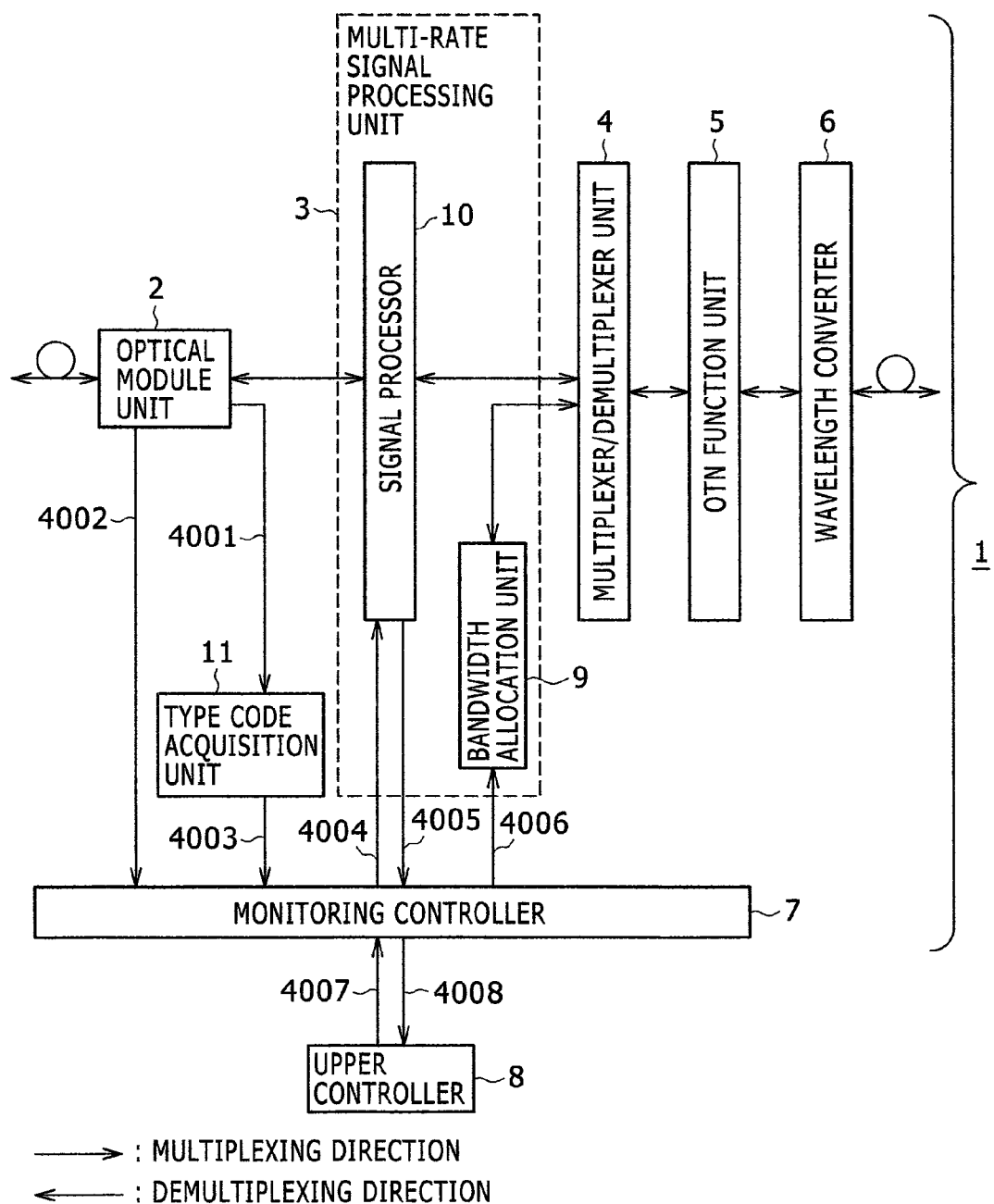
FIG. 4 is a block diagram of the multi-rate interface board.

To overcome such a problem, in the multi-rate interface board 1, the plural signal processors 3005, 3006 having been provided for the wavelength converter 3015, are integrated into one multi-rate signal processing unit 3, together with a multiplexer/demultiplexer unit 4 and an OTN function unit 5. In FIG. 3, a monitoring controller 7 monitors the signal quality of the OTN function unit 5 and controls the multi-rate interface board 1, in response to a control signal 3022 from an upper controller 8 such as Operation System (OpS). The OTN function units (3009 to 3012) transfer signals from a client device 3000 to Och frames. Reference numeral 3018 shows a client device. Reference numeral 3019 shows an OTN optical network. FIG. 4 shows the details of the multi-rate interface board 1 shown in FIG. 3.

In FIG. 4, the multi-rate interface board 1 includes an optical module 2, a multi-rate signal processing unit 3, a multiplexer/demultiplexer unit 4, an OTN function unit 5, a wavelength converter 6, a type code acquisition unit 11, and a monitoring controller 7. The multi-rate interface board 1 is connected, through the monitoring controller 7, to the upper controller 8 in which an administrator can set an accommodation signal.

The optical module 2 receives a low-speed signal with plural light types, signal speeds, and frame formats, as an optical signal. The optical module 2 converts the optical signal to an electrical signal, and transmits to the multi-rate signal processing unit 3. On the other hand, the optical module 2 receives an electrical signal from the multi-rate signal processing unit 3, converts the electrical signal to an optical signal, and transmits a low-speed signal. Here, the optical module 2 can be hot pluggable at will according to the signal type.

The multi-rate signal processing unit 3 further includes: a signal processing unit 10 for processing a signal with a signal speed and frame format, according to the appropriate signal speed and frame format determined by a mode setting instruction 4004 from the monitoring controller 7, independently in the multiplexing direction and in the demultiplexing direction; and a bandwidth allocation unit 9 for mapping a signal to a used bandwidth, as well as demapping the used bandwidth according to a bandwidth allocation instruction 4006 from the monitoring controller 7.

The multiplexer/demultiplexer unit 4 performs multiplexing/demultiplexing of SDH/SONET frames. The OTN function unit 5 maps signals from the multiplexer/demultiplexer unit 4 to OTN frames, and reversely demaps the signals from the OTN frames. Hence, signal monitoring is possible independently in the multiplexing direction and in the demultiplexing direction. The wavelength converter 6 converts an electrical signal to an optical signal to transmit a high-speed optical signal. On the other hand, the wavelength converter 6 receives a high-speed optical signal, converts the high-speed optical signal to an electrical signal, and transmits the electrical signal to the multiplexer/demultiplexer unit 4.

The type code acquisition unit 11 reads an optical module code 4003, which is identification information indicating optical module type, from the optical module 2. The monitoring controller 7 provides monitoring and control by exchanging control information 4007 such as the mode setting instruction 4004 and bandwidth allocation instruction 4006, as well as monitoring result 4008 such as a monitoring result 4005 and the optical module code 4003, with the function blocks.

The type code acquisition unit 11 is connected to the optical module 2 through a standard serial interface 4001 specified by Multi Source Agreement (MSA). The type code acquisition unit 11 acquires the optical module code 4003 from the optical module 2 of each type through the interface 4001, and notifies the monitoring controller 7 of the acquired optical module code 4003. The monitoring controller 7 is connected to the optical module 2 by a signal line other than the serial interface 4001, in order to independently monitor implementation information 4002 from the optical module 2.

The optical module code 4003 for determining the type of the optical module 2, SFP or XFP type, is stored in advance within the optical module 2. The method to acquire the type code through the serial interface 4001 is specified by MSA.

It is to be noted that the technology used in the embodiment is not necessarily compliant with MSA, and other methods than MSA may be used for acquiring the type code, accordingly.

Figure 5:
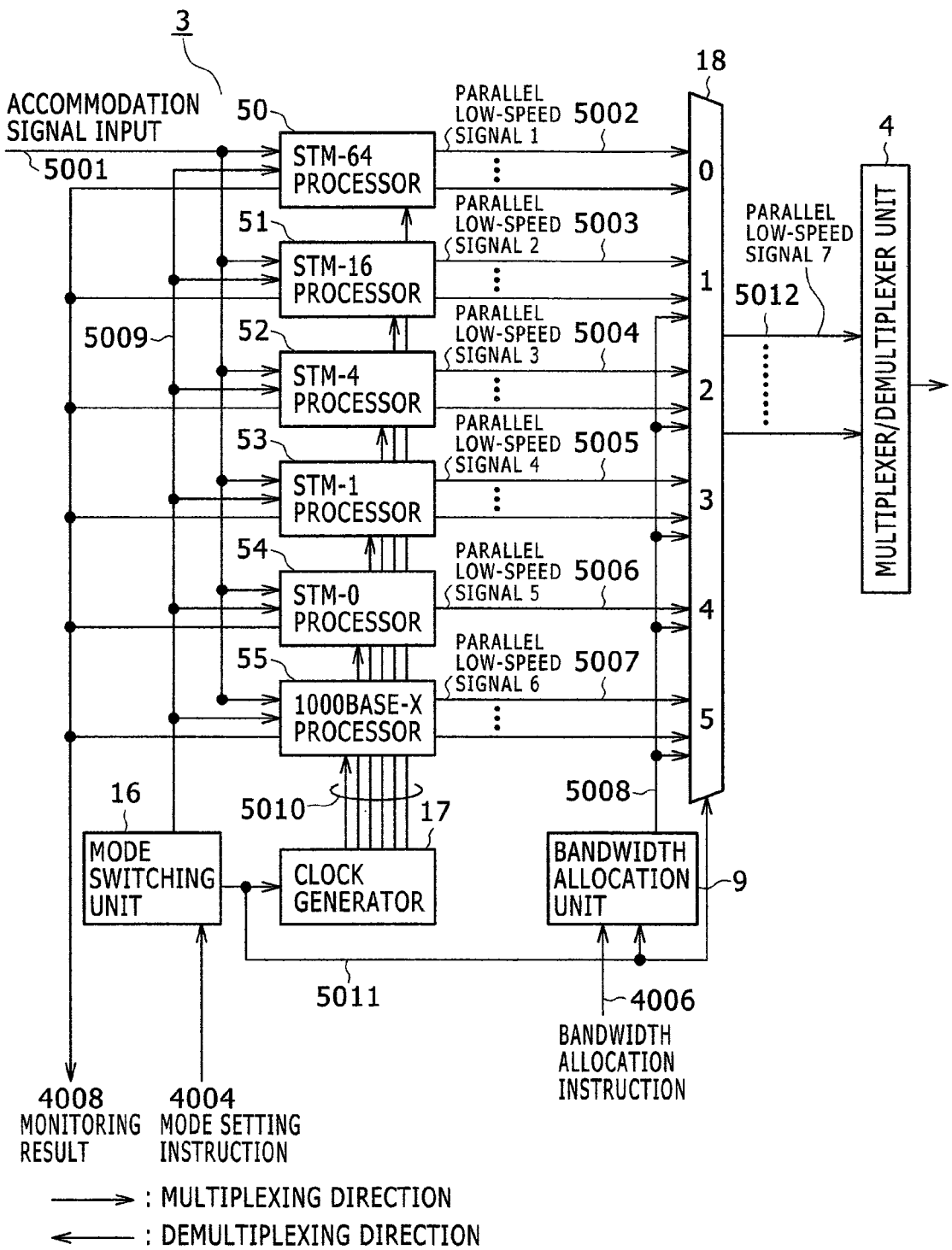
FIG. 5 is a functional block diagram of a multi-rate signal processing unit.

The configuration of the multi-rate signal processing unit 3 of FIG. 4 will be described with reference to FIG. 5. In FIG. 5, the multi-rate signal processing unit 3 includes: six signal processors of an STM-64 processor 50, an STM-16 processor 51, an STM-4 processor 52, an STM-1 processor 53, an STM-0 processor 54, and a 1000BASE-X processor 55; a mode switching unit 16; a clock generator 17; a bandwidth allocation unit 9; and a selector 18.

The mode switching unit 16 notifies the function units of the signal type to be accommodated, in response to the mode setting instruction 4004 from the monitoring controller 7. The clock generator 17 generates clock signals 5010 having a frequency necessary to operate each signal processor. The bandwidth allocation unit 9 inserts a dummy signal 5008 necessary for the unused bandwidth of a signal to be accommodated in an SDH/SONET frame. The selector 18 selects from parallel low-speed signals 1 to 6 (5002 to 5007), in response to a mode selection instruction 5011 from the mode switching unit 16.

More specifically, the STM-64 processor 50, STM-16 processor 51, STM-4 processor 52, STM-1 processor 53, and STM-0 processor 54 respectively include: warning monitoring of STM-64 signal, STM-16 signal, STM-4 signal, STM-1 signal, and STM-0 signal, as well as monitoring process for the quality of the transmission lines. The 1000BASE-X processor 55 includes signal process that is compliant with IEEE802.3, failure monitoring of 1000BASE-X signal, and monitoring process for the quality of the transmission line.

The bandwidth allocation unit 9 operates the shared multiplexer/demultiplexer unit 4 independent of the signal to be accommodated, by inserting the dummy signal 5008 according to the signal type. The selector 18 and the multiplexer/demultiplexer unit 4 are connected with the parallel low-speed signal 7 (5012) in a fixed manner. In the case of multiplexing, the signal accommodation is performed by one of the signal processors 50 to 55, using one of the parallel low-speed signals 1 to 6 (5002 to 5007) for the necessary bandwidth. The dummy signal 5008 is inserted for the other parallel low-speed signals to ensure the bandwidth of the multiplexer/demultiplexer unit 4

The bandwidth allocation unit 9 sets parallel low-speed signals of a parallel low-speed signal, relative to a high speed of a signal that can be accommodated, and determines the number of parallel lines to be used by the parallel low-speed signal according to the signal type. The bandwidth allocation unit 9 inserts the dummy signal 5008 for the lack of the number of the determined parallel low-speed signals. This makes it possible to ensure connection to the multiplexer/demultiplexer unit 4, independent of the signal type. In other words, because the amount of the high-speed signal output from the multiplexer/demultiplexer unit 4 is fixed, when the amount of the high-speed signal is not filled with the signals of the parallel low-speed signal, the bandwidth allocation unit 9 inserts the dummy signal so as to use the entire amount of the high-speed signal.

Further, the bandwidth allocation unit 9 allocates the first signal line of the data lines of the accommodation signal, to the first line of the parallel low-speed signal. On the other hand, in the case of demultiplexing, the bandwidth allocation unit 9 allocates the number of used parallel data lines corresponding to each of the operation modes, from the first line to the STM-64 processor 50, STM-16 processor 51, STM-4 processor 52, STM-1 processor 53, STM-0 processor 54, and 1000BASE-X processor 55, independent of the signal type. The bandwidth allocation unit 9 allocates the first line from the beginning of the STM-64 frame, and maps the STM-64 frame to OTU-2. On the other hand, the bandwidth allocation unit 9 demaps STM-64 from OTU-2, by allocating the first line of the parallel low-speed signal of the STM-64, to the first line of the accommodation signal. This makes demultiplexing easy by selecting the necessary number of used parallel data lines, without performing a signal processing.

A technology such as a method using Generic Framing Procedure (GFP) specified by ITU-T G. 7041, which is known as a versatile capsule technology, is standardized to accommodate a packet, which is a variable length frame represented by Ethernet, into an SONET/SDH network. Thus, the packet can be accommodated in SDH/SONET.

Figure 6:
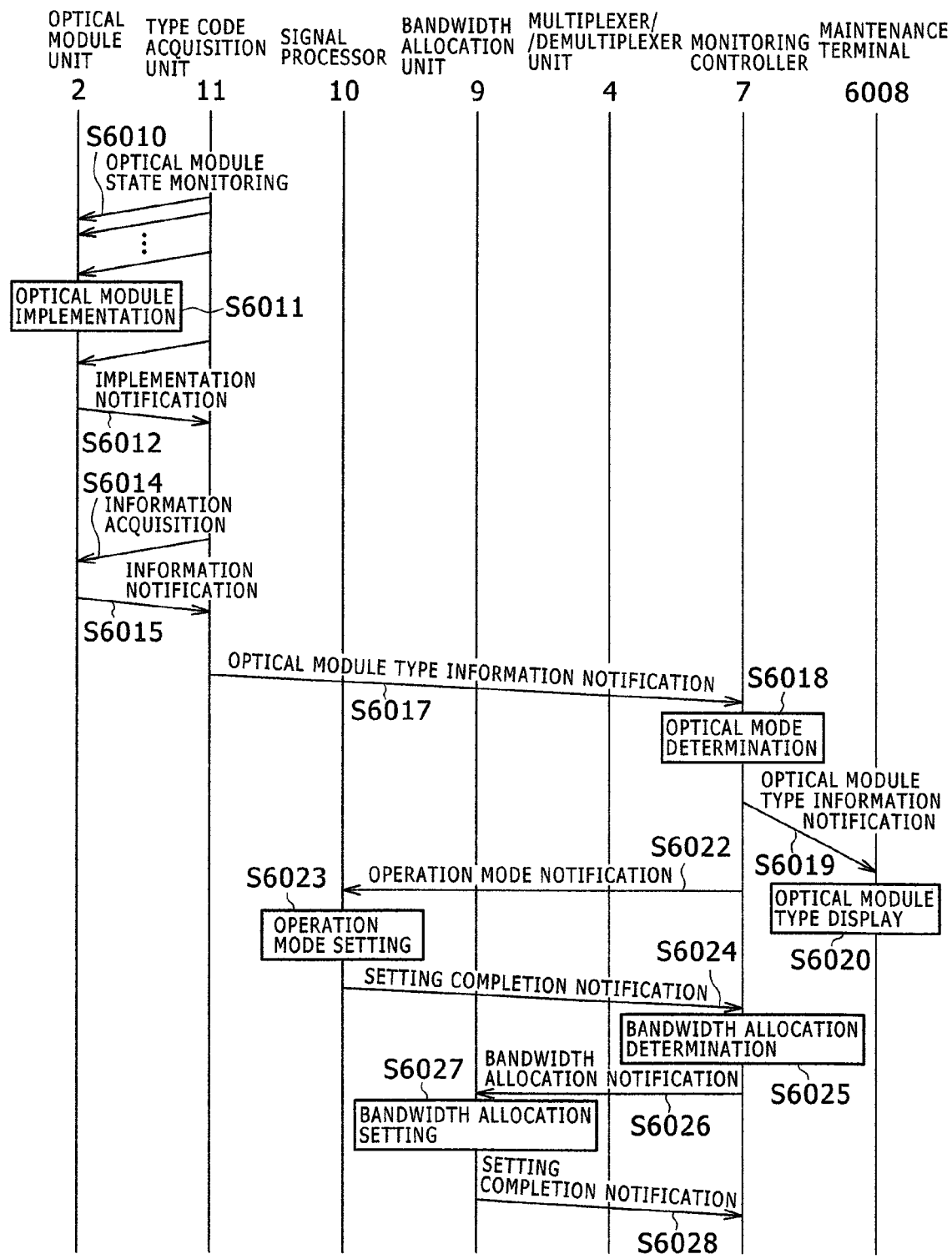
FIG. 6 is a diagram showing the process sequence of the multi-rate interface board.

The process sequence using the multi-rate interface board 1 will be described with reference to FIG. 6. First, the type code acquisition unit 11 monitors the implementation state whether the optical module 2, which is pluggable to an optical module cage, is installed to the multi-rate interface board (S6010). Upon implementation (S6011), the optical module 2 transmits an implementation notification to the type code acquisition unit 11, in response to the state monitoring (S6012). The type code acquisition unit 11 transmits an optical module type information acquisition request (S6014). The optical module 2 returns an information notification to the type code acquisition unit 11 (S6015).

The type code acquisition unit 11 transmits an optical module type information notification to the monitoring controller 7 (S6017). Upon receiving the optical module type information notification, the monitoring controller 7 determines the operation mode (S6018), and transfers the optical module type information notification to a maintenance terminal 6008 (S6019). The maintenance terminal 6008 displays the optical module type on its display.

After determination of the operation mode, the monitoring controller 7 transmits an operation mode notification to the signal processing unit 10 (S6022). Upon receiving the operation mode notification, the signal processing unit 10 sets the operation mode (S6023). The signal processing unit 10 transmits a setting completion notification to the monitoring controller 7 (S6024). Upon receiving the setting completion notification, the monitoring controller 7 performs a bandwidth allocation determination (S6025). The monitoring controller 7 transmits a bandwidth setting notification to the bandwidth allocation unit 9 (S6026). Upon receiving the bandwidth setting notification, the bandwidth allocation unit 9 performs a bandwidth allocation setting (S6027), and transmits a setting completion notification to the monitoring controller 7 (S6028). Incidentally, the optical module type information is the same as the optical module code 4003 of FIG. 4.

The monitoring controller 7 receives the optical module type information, and determines an operation mode 7002 from an operation mode definition table of FIG. 7. Further, the monitoring controller 7 notifies the bandwidth allocation unit 9 of a used parallel number 8004 and unused parallel number 8005 in relation to the accommodation signal, from a parallel speed and signal expansion table of FIG. 8. Then, the bandwidth allocation unit 9 inserts the dummy signal for the unused parallel number 8005.

The definition table for determining the operation mode will be described with reference to FIG. 7. The monitoring controller 7 receives the type code of the optical module 2 acquired by the type code acquisition unit 11. In FIG. 7, using the type code 7001 of the definition table 7000 as a search key, the monitoring controller 7 determines optical module type information 7004 and signal type information 7005 that correspond to the relevant type code. The monitoring controller 7 also determines the bandwidth allocation instruction 7003 from the signal type information 7005. The bandwidth setting is made based on the maximum speed of the signal type to be accommodated. In the case of the definition table of FIG. 7, STM-64 has the maximum speed, so that the bandwidth of STM-64 is set to be the maximum of the used bandwidth. The used bandwidth and the unused bandwidth are determined for each of the other signal types, relative to the bandwidth of STM-64.

The parallel speed and expansion number table will be described with reference to FIG. 8. In FIG. 8, a signal speed and expansion number table 8000 includes an operation mode 8001, a parallel low-speed signal speed 8002, a parallel low-speed signal expansion number 8003, a used parallel number 8004, and an unused parallel number 8005. The parallel low-speed signal speed 8002 and the parallel low-speed signal expansion number 8003 are independent of the operation mode 8001.

In the embodiment, the bandwidth setting is made based on the maximum speed of the signal type to be accommodated. The monitoring controller 7 determines the used parallel number 8004 and the unused parallel number 8005, which are the information indicating the number of parallel expanded signals of the parallel low-speed signal depending on the signal type, based on the parallel low-speed signal expansion number 8003, which is the expansion number of the maximum speed signal, and on the parallel low-speed signal speed 8002, which is the speed of the parallel low-speed signal. In other words, STM-64 uses the entire bandwidth by the signals, and has no unused parallel number 8005. The other operation modes, for example, the signal amount of STM-16 per unit hour is of one-fourth the STM-64, so that the ratio between the used parallel number and the unused parallel number is 1:3 for STM-16.

Figure 9:
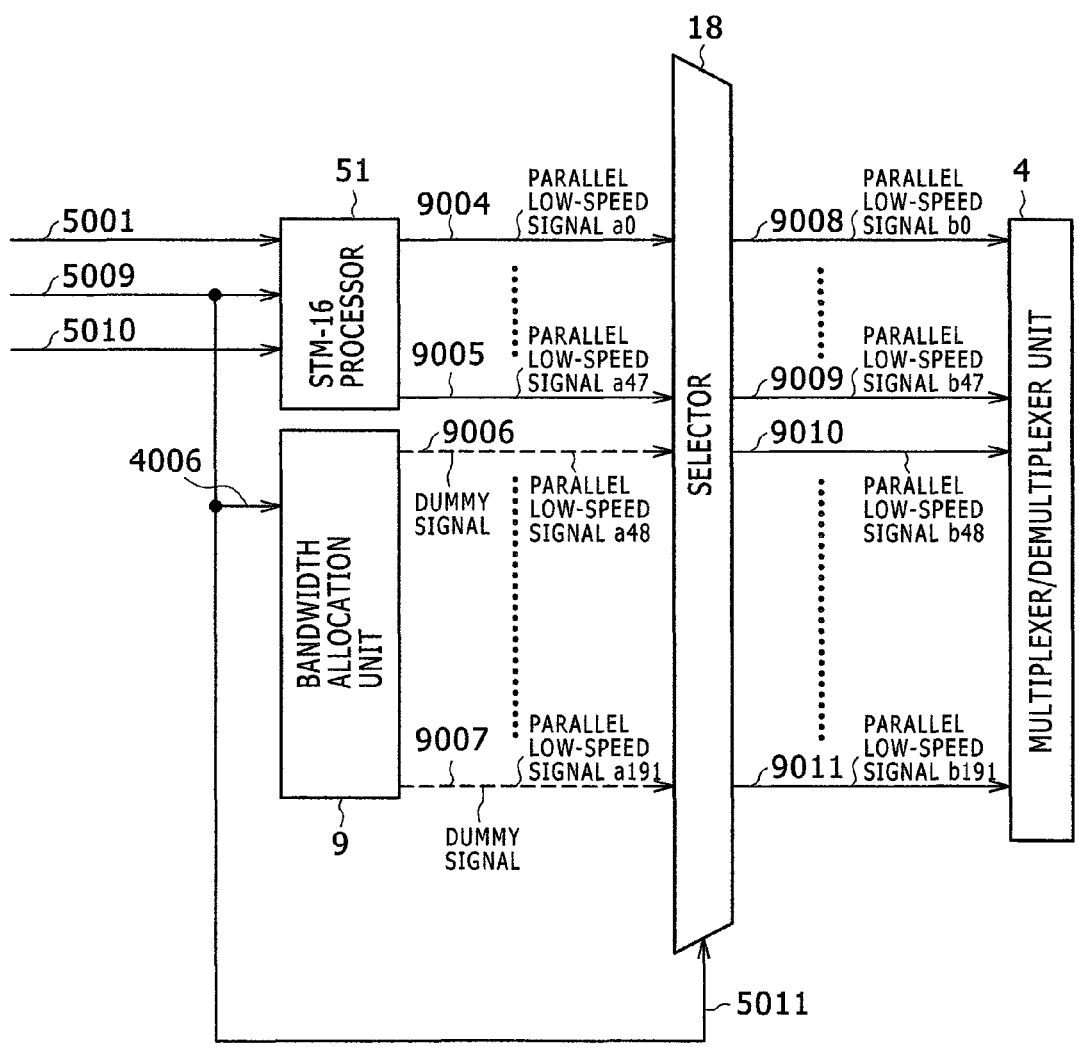
FIG. 9 is a block diagram illustrating the accommodation of an STM-16 signal.

Here, as a specific example, a description will be given of the case in which the signal to be accommodated in an OTN frame of the standardized OTU-2, is STM-16. The configuration in the STM-16 signal processing will be described with reference to FIG. 9. In FIG. 9, the bandwidth allocation unit 9 receives the code of STM-16 from the bandwidth allocation instruction 4006 of the monitoring controller 7. The bandwidth allocation unit 9 recognizes from the used parallel number 8004 that, of parallel low-speed signals (9004 to 9007) of 192 lines represented by line numbers a0 to a191, the parallel low-speed signals (9004, 9005) from the STM-16 signal processor 51 have 48 lines. Then, the bandwidth allocation unit 9 allocates the STM-16 signal to the parallel low-speed signals a0 to a47 (9004 to 9005). Further, the bandwidth allocation unit 9 determines that the unused parallel number of the STM-16 signal processor 51 is 144 lines, from the unused parallel number 8005. Then, the bandwidth allocation unit 9 inserts the dummy signal of 144 lines generated by the bandwidth allocation unit 9, to the line numbers a48 to a191 (9006 to 9007) of the 192-line parallel low-speed signals. As a result, the bandwidth allocation unit 9 configures the 192-line parallel low-speed signals a0 to a191 (9004 to 9007), and connects to the selector 18. The selector 18 selects the parallel low-speed signals a0 to a191 (9004 to 9007) in response to a mode selection instruction 5011, allocates the parallel low-speed signals a0 to a47, to b0 to b47 of the parallel low-speed signals b0 to b91 (9008 to 9011) of the STM-64 frame in the multiplexer/demultiplexer unit 4. Thus, STM-16 is accommodated in the STM-64 frame.

Figure 10:
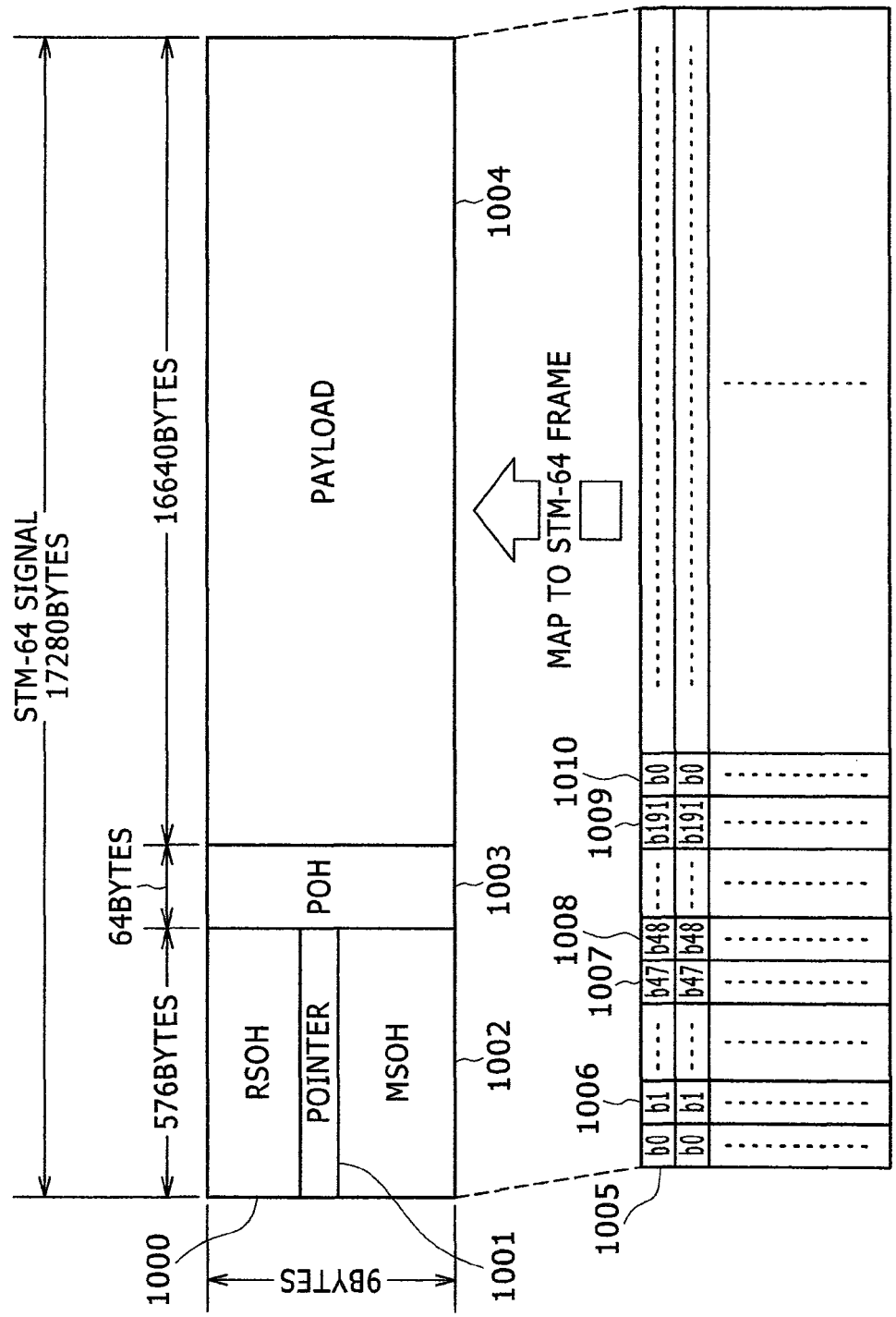
FIG. 10 is an illustration of the signal accommodation to STM-64.
Figure 11:
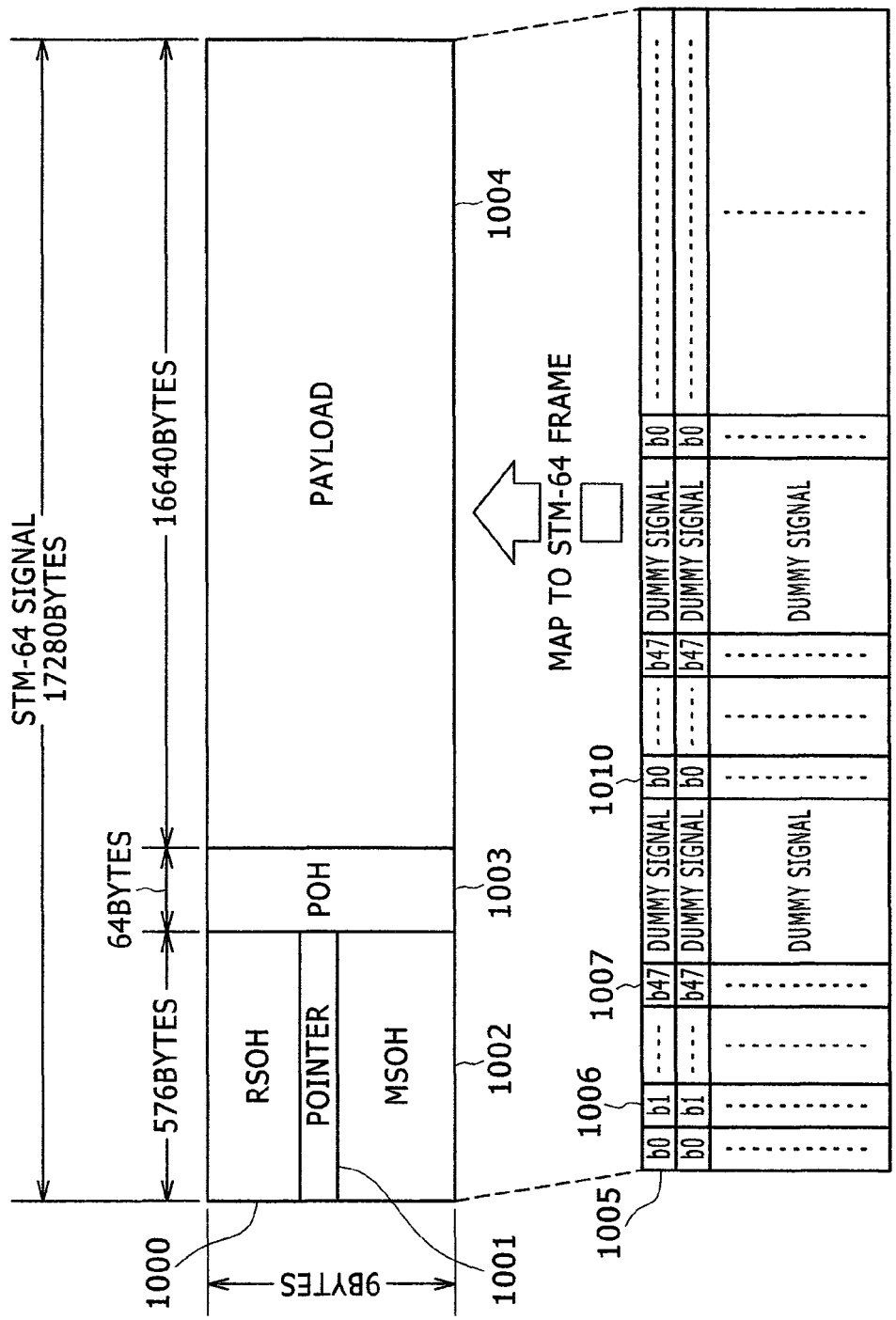
FIG. 11 is an illustration of the STM-16 signal accommodated to the STM-64.

FIG. 10 shows a typical frame of STM-64, and FIG. 11 shows a frame of STM-64 in which STM-16 is accommodated. In FIG. 10, the STM-64 signal is a frame format prescribed in ITU-T G.707, and the signal includes: various overheads such as a relay section overhead (RSOH 1000), a multiplex section overhead (MSOH 1002), and a path overhead (POH 1003); a pointer 1001; and a payload 1004 in which user data is stored. Here, the multiplexer/demultiplexer unit accommodates the parallel speed signals b0 to b91 (1005 to 1009) into the entire STM-64 frame, in addition to the payload in which the user data of the STM-64 frame (17280 Bytes×9 Bytes) is stored.

In FIG. 11, when the STM-16 is accommodated in the STM-64 frame, the STM-16 signal is accommodated in b0 (1005) to b47 (1007) and the dummy signal is inserted to b48 (1008) to b191 (1009), and thus the STM-64 is configured.

Figure 12:
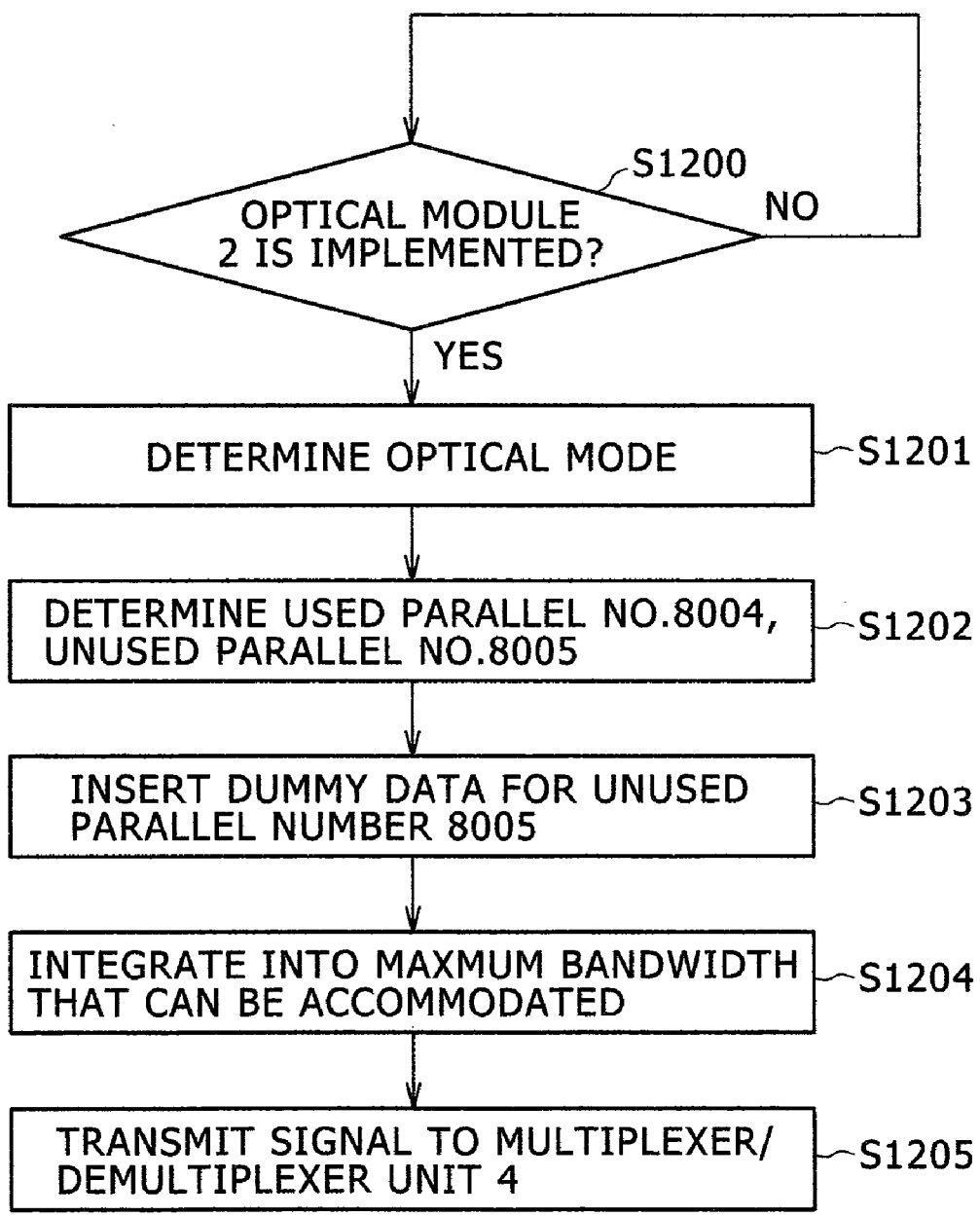
FIG. 12 is a flowchart of a process for determining the bandwidth to be allocated to each signal type.

The bandwidth process sequence, which is the feature of the embodiment, will be described with reference to FIG. 12. In FIG. 12, the implementation of the optical module 2, namely, the installation of the optical module 2 to the interface board 1 (S1200), enables the monitoring controller 7 to determine the operation mode of the optical module 2 (S1201). More specifically, the monitoring controller 7 determines the operation mode 7002 corresponding to the acquired type code 7001. Then, from the parallel speed and signal expansion table 8000, the monitoring controller 7 determines the used parallel number 8004 and unused parallel number 8005 corresponding to the determined operation mode 8001 (S1202). Then, the monitoring controller 7 notifies the signal processor corresponding to the operation mode of the used parallel number 8004, and notifies the bandwidth allocation unit 9 of the unused parallel number 8005, respectively. Upon receiving the notification, the bandwidth allocation unit 9 inserts the dummy signal as parallel low-speed signals of the unused parallel number (S1203). As a result, the multi-rate signal processing unit 3 integrates into the maximum bandwidth of the maximum speed signal that can be accommodated, which is defined in the multi-rate interface board, independent of the signal type (S1204). Then, the multi-rate signal processing unit 3 transmits the signals to the multiplexer/demultiplexer unit 4 (S1205).

Figure 13:
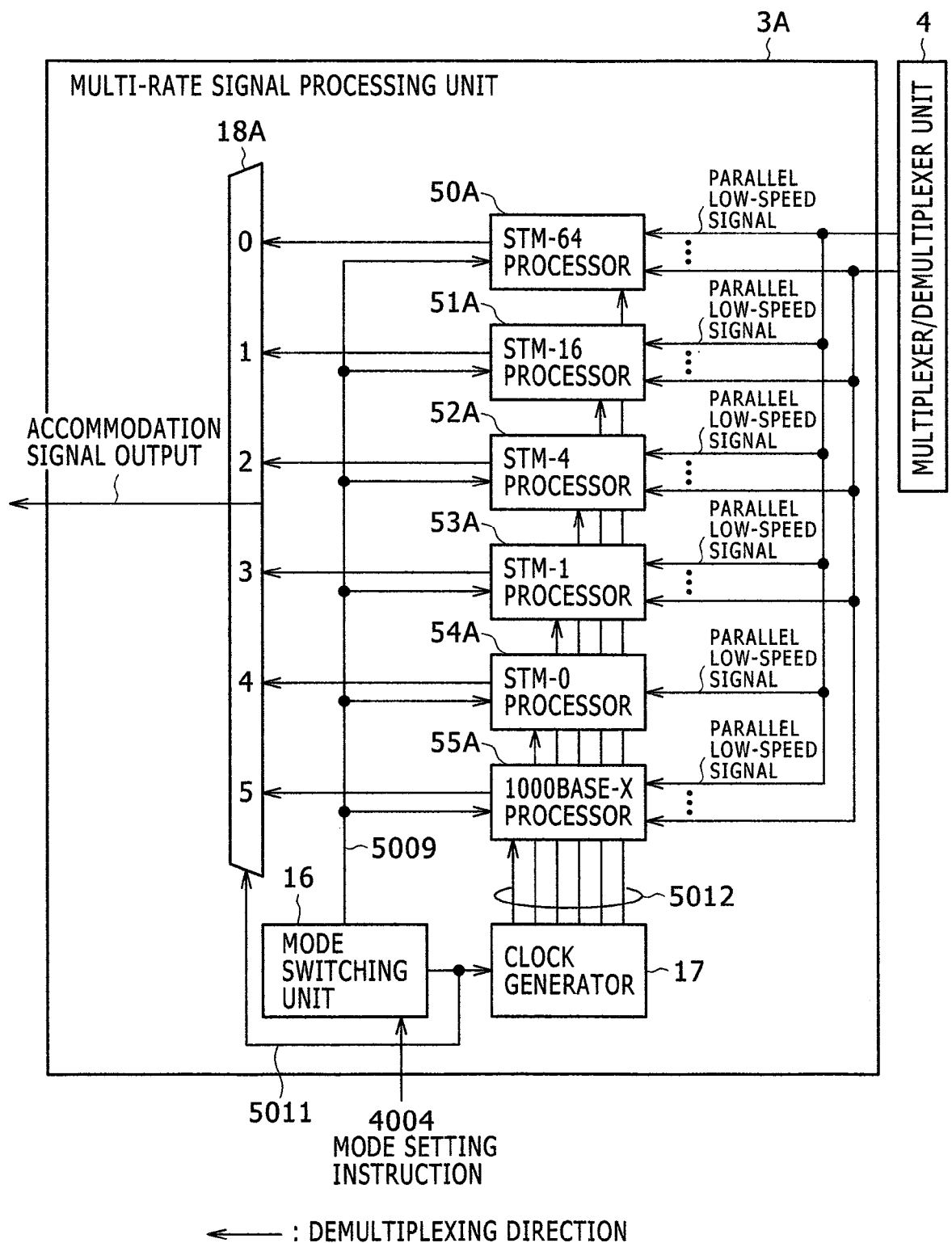
FIG. 13 is a block diagram illustrating demultiplexing operation.

The demultiplexing operation of the multi-rate signal processing unit will be described with reference to FIG. 13. In FIG. 13, a multi-rate signal processing unit 3A includes signal processors connected to the multiplexer/demultiplexer unit 4, a selector 18A, a clock generator 17, and a mode switching unit 16. The signal processors include STM-64 processor 50A, STM-16 processor 51A, STM-4 processor 52A, STM-1 processor 53A, STM-0 processor 54A, and 1000BASE-X processor 55A. The selector 18A selects one of the outputs of the signal processors. The clock generator 17 supplies a clock to each of the signal processors. The mode switching unit 16 transmits a mode setting instruction 5009 to the signal processors, while transmitting the mode setting instruction 5011 to the selector 18A and the clock generator 17.

The parallel low-speed signal (50 Mbps) from the multiplexer/demultiplexer unit 4 is input to the STM-64 processor 50A, STM-16 processor 51A, STM-4 processor 52A, STM-1 processor 53A, STM-0 processor 54A, and 1000BASE-X processor 55A, respectively. The signal processors perform parallel/serial conversion using the low-speed signals for the used parallel number 8004, from the first line of the parallel low-speed signal. It is to be noted that only the processor selected by the mode switching unit 16, practically performs parallel/serial conversion. The output of the selected processor is selected by the selector 18A, and is output from the multi-rate signal processing unit 3A as the accommodation signal.

In FIG. 13, the monitoring signal for the processors is omitted. However, the monitoring result 4005 may be given to the monitoring controller 7 similarly as shown in FIGS. 4 and 5.

Figure 14:
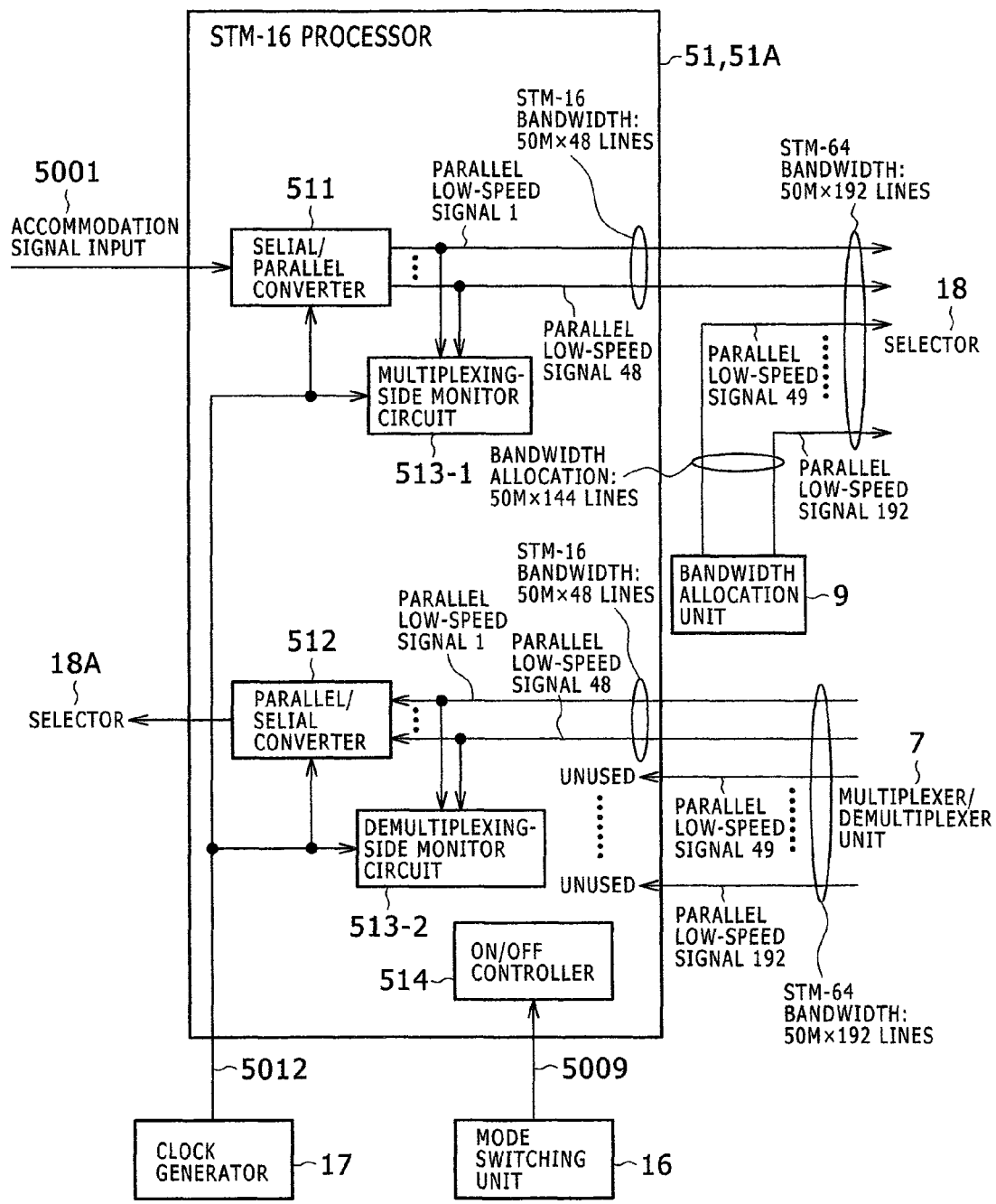
FIG. 14 is a functional block diagram showing the configuration of an STM-16 processor.

The functional blocks of the STM-16 processor will be described with reference to FIG. 14. It will be apparent to those skilled in the art that the other processors have the same functional blocks. In FIG. 14, the STM-16 processor 51 (51A) includes a serial/parallel converter 511, a parallel/serial converter 512, monitoring circuits 513 on the multiplexing side and on the demultiplexing side, and an ON/OFF controller 514.

The serial/parallel converter 511 converts a serial accommodation signal 5001 to a parallel signal of 50 Mbits/s×48 corresponding to the STM-16 signal bandwidth, and outputs the parallel signal to the selector 18. The parallel/serial converter 512 performs parallel/serial conversion on the 48-line low-speed signals (50 Mbits/s), which come from a multiplexer/demultiplexer unit 7, from the first line of the parallel signal of 50 Mbits/s×192 corresponding to the STM-64 signal bandwidth, and transmits the serial signal to the selector 18A. The multiplexing-side monitoring circuit 513-1 monitors the output of the serial/parallel converter 511. The demultiplexing-side monitoring circuit 513-2 monitors the input of the parallel/serial converter 512. The monitoring circuits 513 transmit the monitoring results to the monitoring controller 7 not shown. The ON/OFF controller 514 controls the operation and stopping of the STM-16 processor 51 (51A) based on the mode setting instruction from the mode switching unit 16. Further, the serial/parallel converter 511, the parallel/serial converter 512, and the monitoring circuits 513 on the multiplexer and demultiplexing sides are all operated based on the clock from the clock generator 17.

Since the operation of the bandwidth allocation unit 9 of FIG. 14 has been described above, its description will be omitted.

According to the first embodiment, it is possible to provide management using the standardized OTN frame, independent of the signal type. Further, perfect transmission is possible without terminating the signal to be accommodated, so that the client device can establish a network without regard to the transmission equipment.

Second Embodiment

In the first embodiment, the multi-rate signal processing unit 3 allocates the first signal line of the data lines of the accommodation signal, to the first line of the parallel low-speed signal, independent of the signal type to be accommodated. On the other hand, in the case of demultiplexing, the multi-rate signal processing unit 3 allocates the number of used parallel data lines corresponding to each of the operation modes, to the STM-64 processor, STM-16 processor, STM-4 processor, STM-1 processor, STM-0 processor, and 1000BASE-X processor. Then, the selector selects the signal to be accommodated. However, the first line is used independent of the signal type in demultiplexing, thereby making the selector configuration complicated. In a second embodiment, a description will be given of the execution method in a configuration with no selector.

Figure 15:
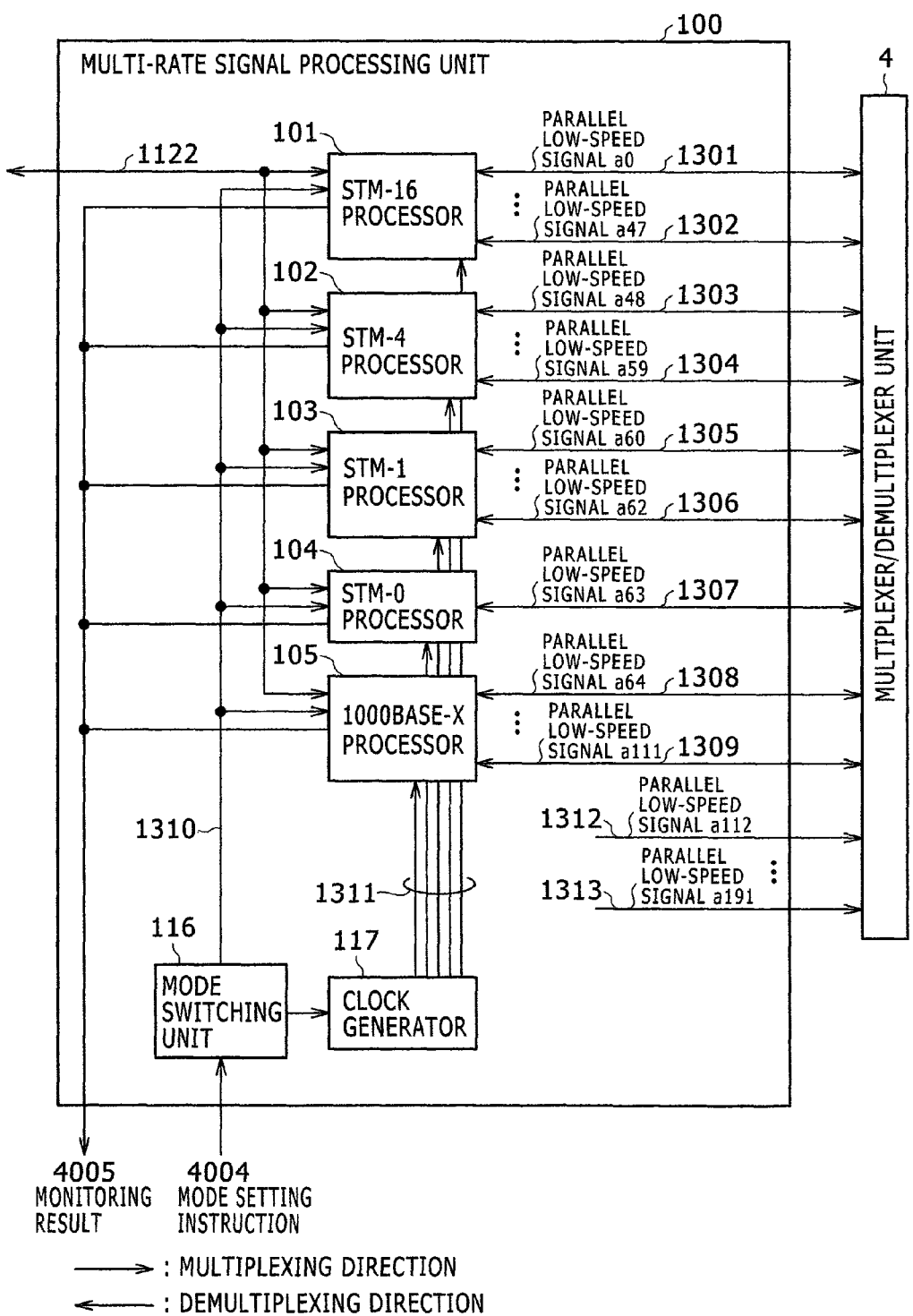
FIG. 15 is a functional block diagram of a multi-rate signal processing unit.

Referring to FIG. 15, a description will be given of the configuration of a multi-rate signal processing unit 100 in the second embodiment. In FIG. 15, the multi-rate signal processing unit 100 includes: five signal processors of an STM-16 processor 101, an STM-4 processor 102, an STM-1 processor 103, an STM-0 processor 104, and a 1000BASE-X processor 105; a mode switching unit 116 for setting an operation mode to the signal processors 101 to 105, in response to a mode setting instruction 4004 from the monitoring controller 7; and a clock generator 117 for generating a clock signal 1311 having a frequency necessary to operate a selected signal processor.

The multi-rate signal processing unit 100 and the multiplexer/demultiplexer unit 4 are connected with parallel low-speed signals a0 to a191 (1301 to 1313) at a fixed rate. However, the signal is accommodated in the fixed lines of the parallel low-speed signals a0 to a191 (1301 to 1313) according to the signal type. In other words, the multi-rate signal processing unit 100 allocates the parallel low-speed signal of the STM-16 processor 101 to the parallel low-speed signals a0 to a47 (1301 to 1302), the parallel low-speed signal of the STM-4 processor 102 to the parallel low-speed signals a48 to a59 (1303 to 1304), the parallel low-speed signal of the STM-1 processor 103 to the parallel low-speed signals a60 to a62 (1305 to 1306), the parallel low-speed signal of the STM-0 processor 104 to the parallel low-speed signal a63 (1307), and the parallel low-speed signal of the 1000BASE-X processor 105 to the parallel low-speed signals a64 to a111 (1308 to 1309), respectively.

On the other hand, in the case of demultiplexing, the multi-rate processing unit 100 allocates, of the parallel low-speed signals a0 to a191 (1301 to 1313), a0 to a47 (1301 to 1302) to the STM-16 processor 101, a48 to a59 (1303 to 1304) to the STM-4 processor 102, a60 to a62 (1305 to 1306) to the STM-1 processor 103, a63 (1307) to the STM-0 processor 104, and a64 to a111 (1308 to 1309) to the 1000BASE-X processor 105, respectively, according to the signal type.

As described above, the multi-rate signal processing unit 100 allocates the first line from the beginning of the STM-64 frame, when mapping the STM-64 frame to OTU-2. This makes it possible, in the case of demapping of the STM-64 from OTU-2, to allocate the first line of the parallel low-speed signal of STM-64, to the first line of the accommodation signal. As a result, this facilitates demultiplexing by selecting the necessary number of used parallel data lines, without performing a signal processing. Thus, unlike the first embodiment, there is no need to configure the bandwidth allocation unit as well as the selector.

Figure 16:
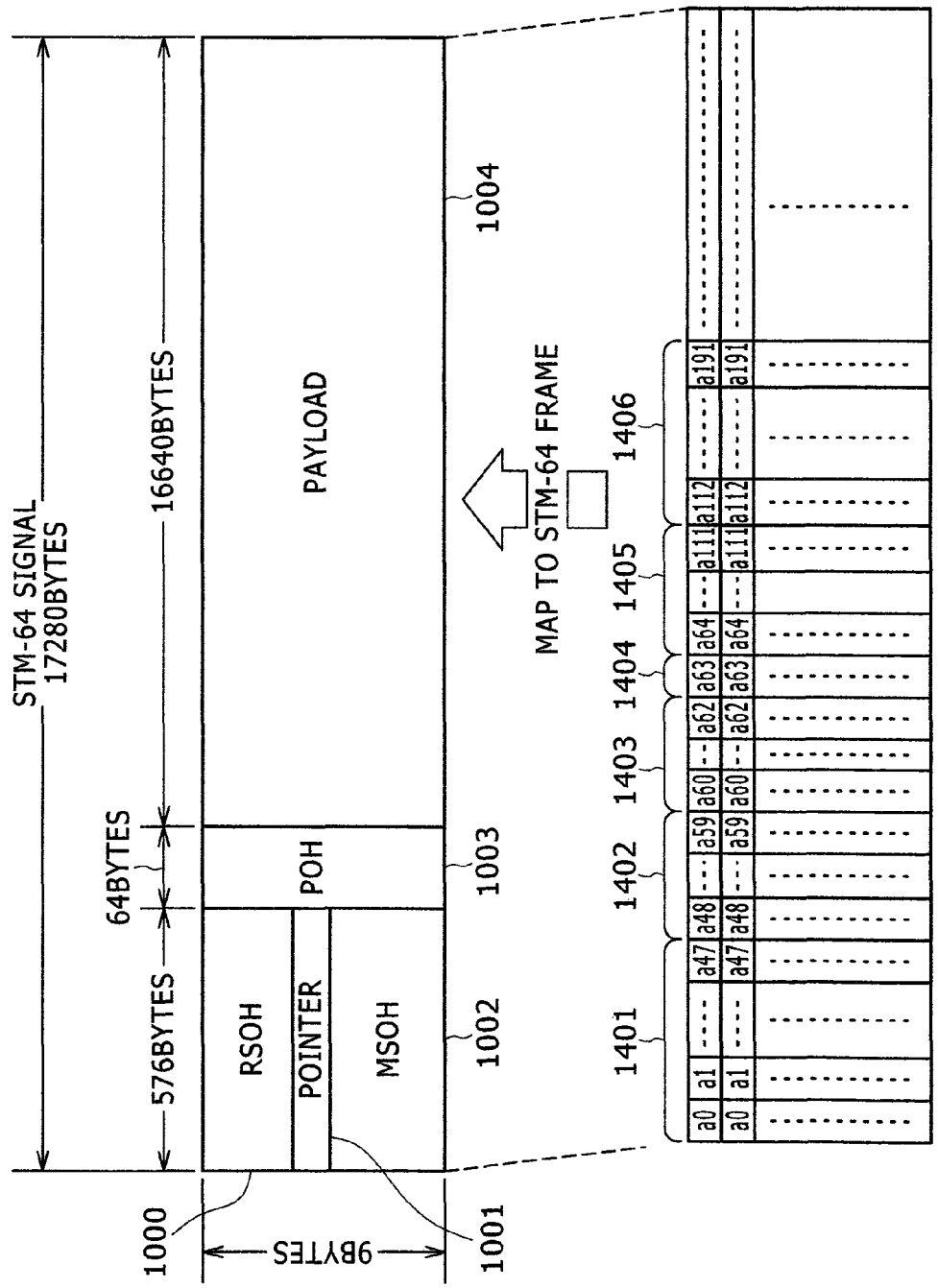
FIG. 16 is an illustration of the signal accommodation to STM-64.

FIG. 16 shows a frame format in the application of the second embodiment. In FIG. 16, the parallel low-speed signals a0 to a191 (1301 to 1313) are mapped as follows: a0 to a47, to STM-16 signal 1401; a49 to a59, to STM-4 signal 1402; a60 to a62, to STM-1 signal 1403; a63 to STM-0 signal 1404; a64 to a111, to 1000BASE-X signal 1405; and a112 to a191, to dummy signal 1406, independent of the signal to be accommodated. The add/drop position varies in the STM-64 frame depending on the signal type. Thus, it is necessary to acquire data of a desired position according to the type code, in order to demultiplex the data.

According to the second embodiment, a single multi-rate interface board is used to realize a network capable of accommodating a wide range of signal speeds to the standardized OTN frame, and of transmitting the input signal as it is. Because the interface board can accommodate various types of signals, it is possible to flexibly change the network configuration only by the implementation of the optical module of the embodiment, or by the operation from the upper controller. In addition, because the input signal is perfectly transmitted without being terminated, it is possible to establish a network without regard to the transmission equipment.

Further, according to the embodiment, the multi-rate interface board capable of accommodating various types of signals is used in a network in which various signals exist. This reduces the number of components, allowing the change of the signal type to be processed in the interface board, only by the operation from the upper controller or by the implementation of the optical module. Thus, a replacement operation of the interface board can be omitted in the case of an unexpected change of the network configuration. The accommodation to the OTN frame is performed at a fixed rate, so that the multi-rate interface board can be realized with an inexpensive configuration without the need to implement a separate OTN processor for each signal to be accommodated.

What is claimed is:

1. Optical transmission equipment comprising:
    a signal processing unit, said signal processing unit including:
        an optical transceiver module inlet in which an optical transceiver module is installed,
        a plurality of processors corresponding to a plurality of signal types, respectively,
        a multiplexer/demultiplexer for accommodating a parallel-converted signal, and
        a bandwidth allocation circuit for processing bandwidth allocation;
        a type code acquisition circuit for acquiring an optical module code from the optical transceiver module and notifying a monitoring controller of the optical module code; and
    the monitoring controller for determining an operation mode based on the optical module code acquired by the type code acquisition circuit and notifying the bandwidth allocation circuit of an unused bandwidth based on the operation mode,
    wherein the bandwidth allocation ciruit processes the bandwidth allocation by inserting a signal of the unused bandwidth notified by the monitoring controller.

2. The optical transmission equipment according to claim 1, wherein the signal of the unused bandwidth is a dummy signal.

3. The optical transmission equipment according to claim 1, wherein said plurality of processors include a first processor for a first signal and a second processor for a second signal, and
    wherein one of the first processor and the second processor is selected for processing based on a selection signal from the monitoring controller.

4. The optical transmission equipment according to claim 1, wherein said parallel-converted signal uses an Optical Transport Network (OTN) frame.

* * * * *